United States Patent [19]

McCoin

[11] 4,192,200

[45] Mar. 11, 1980

[54] VARIABLE RATIO GEAR TRANSMISSION

[75] Inventor: Dan K. McCoin, El Paso, Tex.

[73] Assignee: Bales-McCoin Research, Inc., El Paso, Tex.

[21] Appl. No.: 716,341

[22] Filed: Aug. 20, 1976

[51] Int. Cl.² ............................................. F16N 15/16
[52] U.S. Cl. ....................................... 74/690; 74/190; 74/191; 74/691
[58] Field of Search ................. 74/191, 690, 691, 681, 74/689, 190, 190.5, 207, 208, 209, 213, 216, 193, 682

[56] References Cited

U.S. PATENT DOCUMENTS

| | | | |
|---|---|---|---|
| 598,762 | 2/1898 | Behrens | 74/690 |
| 716,550 | 12/1902 | Inness et al. | 74/191 |
| 1,011,629 | 12/1911 | Lacombe | 74/191 |
| 2,178,859 | 11/1939 | Jett et al. | 74/690 |
| 2,229,338 | 1/1941 | Powers | 74/691 |
| 3,158,041 | 11/1964 | Rae | 74/690 |
| 4,026,166 | 5/1977 | Jackson | 74/691 |

FOREIGN PATENT DOCUMENTS

| | | | |
|---|---|---|---|
| 145429 | 4/1936 | Austria | 74/191 |
| 314836 | 10/1914 | Fed. Rep. of Germany | 74/191 |
| 1226386 | 10/1966 | Fed. Rep. of Germany | 74/191 |
| 26756 | of 1908 | United Kingdom | 74/190 |

*Primary Examiner*—Samuel Scott
*Assistant Examiner*—Daniel J. O'Connor
*Attorney, Agent, or Firm*—Clarence A. O'Brien; Harvey B. Jacobson

[57] ABSTRACT

Power is transmitted through a low torque power path established by a variable traction drive assembly to control the drive ratio of a plural power path, constant mesh gear transmission. The contact pressure associated with the traction drive assembly is varied as a function of the transmission drive ratio that is varied between reverse and forward drive values under control of the traction drive assembly.

10 Claims, 9 Drawing Figures

Fig. 2

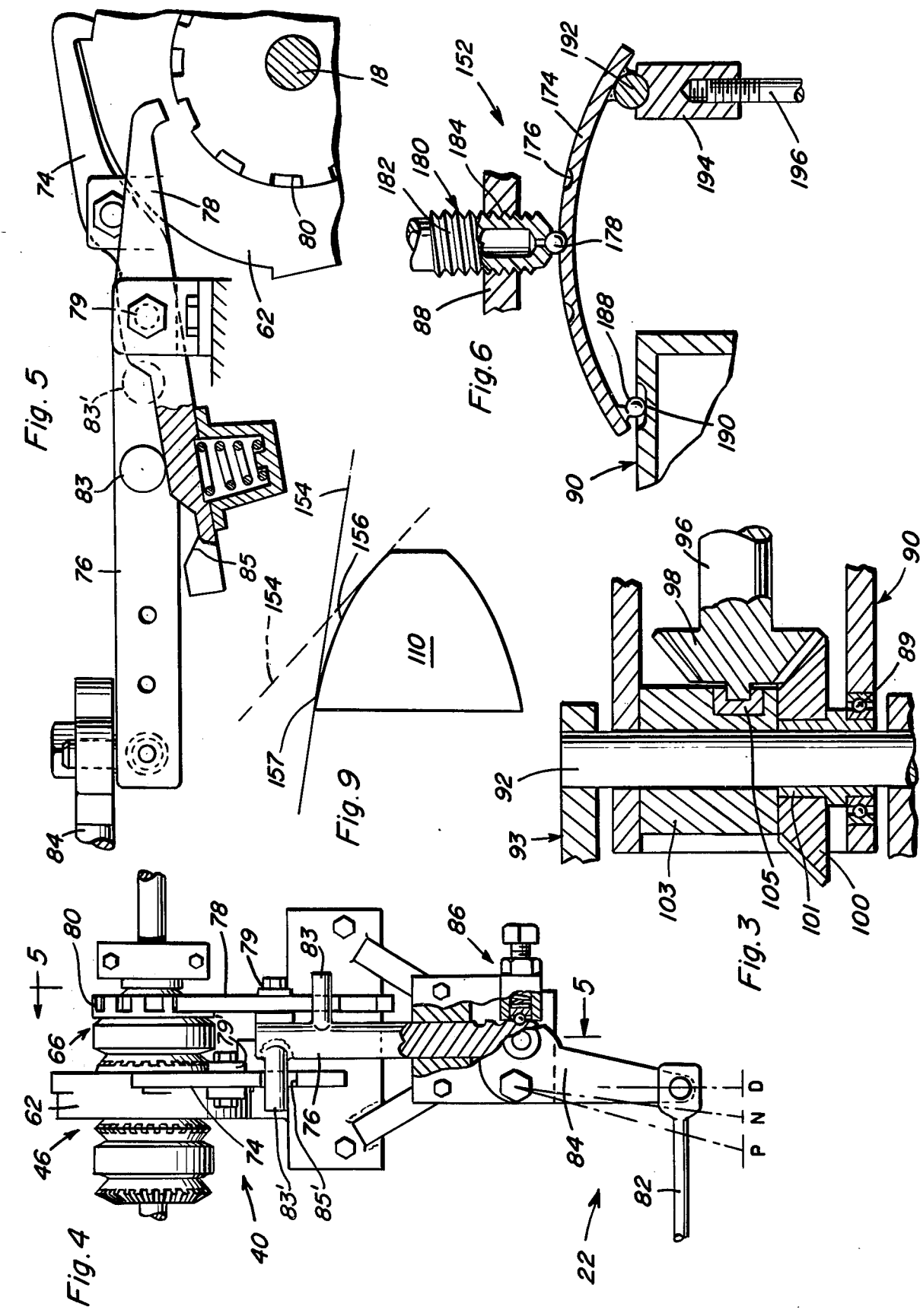

VARIABLE RATIO GEAR TRANSMISSION

BACKGROUND OF THE INVENTION

This invention relates to planetary gear transmissions of the split power path type having a variable speed drive unit in one of the power paths for varying the overall drive ratio of the transmission in an infinitely variable manner.

Split power path types of planetary gear transmissions with infinitely variable speed drive units are well known. Generally, such transmissions include a power path extending through the variable speed drive unit which transmits at times a substantial portion of the input torque. Accordingly, the variable speed drive unit must be designed to have a high torque transmitting capacity and must therefore be made of a relatively large size. Further, the type of variable speed unit selected must often be compatable with drive ratio change in a precise and smooth manner through a relatively wide change speed range including both reverse and forward drive ratios. While traction drive types of variable speed drive units could be ideally suited for such purposes, they are subject to rapid wear of the traction engaging surfaces and slippage under high torque conditions. The use of high contact pressures between the engaging surfaces to minimize slippage and meet the torque loading increases both mechanical losses and the rate of wear. Attempts to vary the contact pressure as a function of the centrifugal force or rotational speed of traction drive cone elements for example, have not proved to be a very practicable solution in heavy duty transmissions utilized for propelling automotive vehicles. It is therefore an important object of the present invention to provide a heavy duty transmission of the split power path type capable of providing a wide range of drive ratios under continuous control of a variable speed drive unit in one power path having a smaller drive ratio range. It is a further object to transmit a relatively low torque through the aforesaid variable drive unit under an optimum contact pressure to minimize wear and shear stresses as well as to reduce mechanical losses.

SUMMARY OF THE INVENTION

In accordance with the present invention, a pair of power transmitting planetary gear sets are interconnected to establish a high torque power path and a low torque power path combined to drive an output shaft at a drive ratio that is controlled through an infinitely variable speed unit of the traction or friction cone type in the low torque power path. A low torque, high speed take off from the input shaft of the transmission drives the variable speed unit and one element of a differential gear set through which ratio controlling torque is transmitted to the power transmitting gearing. The variable speed unit includes a drive cone that is pivotally displaced about a pivot point in response to movement of a driven cone along the rotational axis of a driven gear to which it is drivingly connected. The cone members have substantially the same general pitch from which the engaging surface of the driven cone deviates by virtue of a crown curvature establishing tangential contact between the cone surfaces for all positions of the movable driven cone. A nominal contact pressure between the cone surfaces is selected through a tension control device to minimize losses and wear, the contact pressure being automatically varied as a function of the transmission drive ratio so as to establish a minimum contact pressure for that position of the driven cone corresponding to a neutral or idling condition of the transmission and otherwise provide an optimum contact pressure to achieve traction with minimum stress. Therefore, the arrangement of gearing is such that the overall drive ratio of the transmission is varied within a range extending between a reverse and forward drive ratios as limits corresponding to a unidirectional drive ratio range of the variable speed unit between overdrive and reduction drive ratio limits. The drive ratio of the variable speed unit may be changed through a reversible electric motor by any suitable automotive transmission control system including one arranged to maintain a substantially constant input speed by operation of the engine at optimum speed and loading under all running conditions without change in the inflow fuel rate. Vehicle operation with minimum exhaust pollution from the engine and maximum fuel economy is thereby achieved.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

FIG. 2 is a top plan view of a transmission constructed in accordance with the present invention with a section of the transmission housing and gear casings removed.

FIG. 3 is a partial section view taken substantially through a plane indicated by section line 3—3 in FIG. 2.

FIG. 4 is a top plan view of a portion of the transmission shown in FIG. 2 illustrating certain controls associated therewith.

FIG. 5 is a partial sectional view taken substantially through a plane indicated by section line 5—5 in FIG. 4.

FIG. 6 is an enlarged section view through a portion of the tension control associated with the transmission shown in FIG. 2.

FIG. 9 is a friction cone contact diagram corresponding to the variable drive unit of the transmission shown in FIGS. 2 and 8.

DETAILED DESCRIPTION OF THE PREFERRED EMBODIMENT

Figure 1:
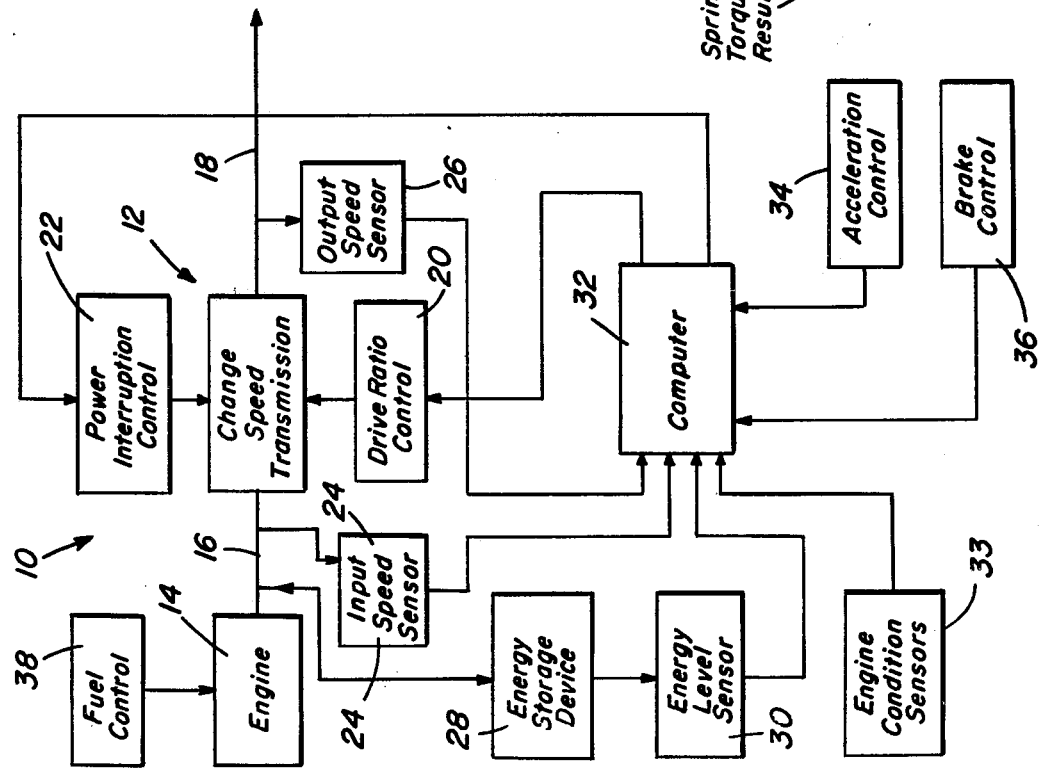
FIG. 1 is a schematic block diagram illustrating a control system with which the present invention is associated.

Referring now to the drawings in detail, FIG. 1 diagrams a transmission control system 10 for an automotive vehicle as a preferred installation for the change speed transmission of the present invention generally denoted by reference numeral 12. As depicted in FIG. 1, power is delivered at a substantially constant speed to the transmission 12 from a prime mover, such as an internal combustion engine 14, through an input shaft element 16. Power is delivered by the transmission to the vehicle propelling wheels through an output shaft element 18. Associated with the transmission 12 for selecting its drive ratio, is a drive ratio control component 20. A power interruption control component 22 also associated with the transmission is provided in order to interrupt drive through the transmission when desired as will be explained hereafter. Information regarding the input and output speeds of the transmission is provided by input and output speed sensors 24 and 26, respectively, connected to the input and output shaft elements.

The transmission control system may also be associated with an energy storage device 28, such as a fly wheel driven by the input shaft, with which an energy level sensor 30 is associated. The energy level information from sensor 30 is fed to a computer 32 to which speed signal information is also fed from the input and output speed sensors 24 and 26. Additional input information is fed to the computer from sensors 33 reflecting various engine conditions such as oil pressure coolant temperature, engine block vibration, etc. while information regarding the positions of the vehicle accelerator and brake pedals is fed to the computer from accelerator and brake monitoring components 34 and 36. The information fed into the computer may be appropriately processed to supply the desired control signals to the drive ratio control component 20 for selection of the optimum transmission drive ratio. Also, another output of the computer is fed to the power interruption control component 22 for disengaging the transmission under certain conditions either monitored by the computer or manually imposed. Thus, the transmission is disengaged regardless of input shaft speed or drive ratio condition when there is a loss of lubrication pressure, excessive heat or vibration, for example, or to allow pushing of the vehicle when desired.

In accordance with one embodiment of the present invention, the drive ratio of the transmission is selected by the computer to meet the desired requirements dependent on the demand of the vehicle accelerator pedal and the energy level of the energy storage device 28 with the engine being operated intermittently as required and with optimum loading. Thus, acceleration of the vehicle may be controlled without varying the supply of fuel to the engine 14 as in the case of prior art arrangements. Fuel may therefore be supplied to the engine at an optimum supply rate for most efficient engine operation after start-up, by means of the fuel control component 38.

Figure 2:
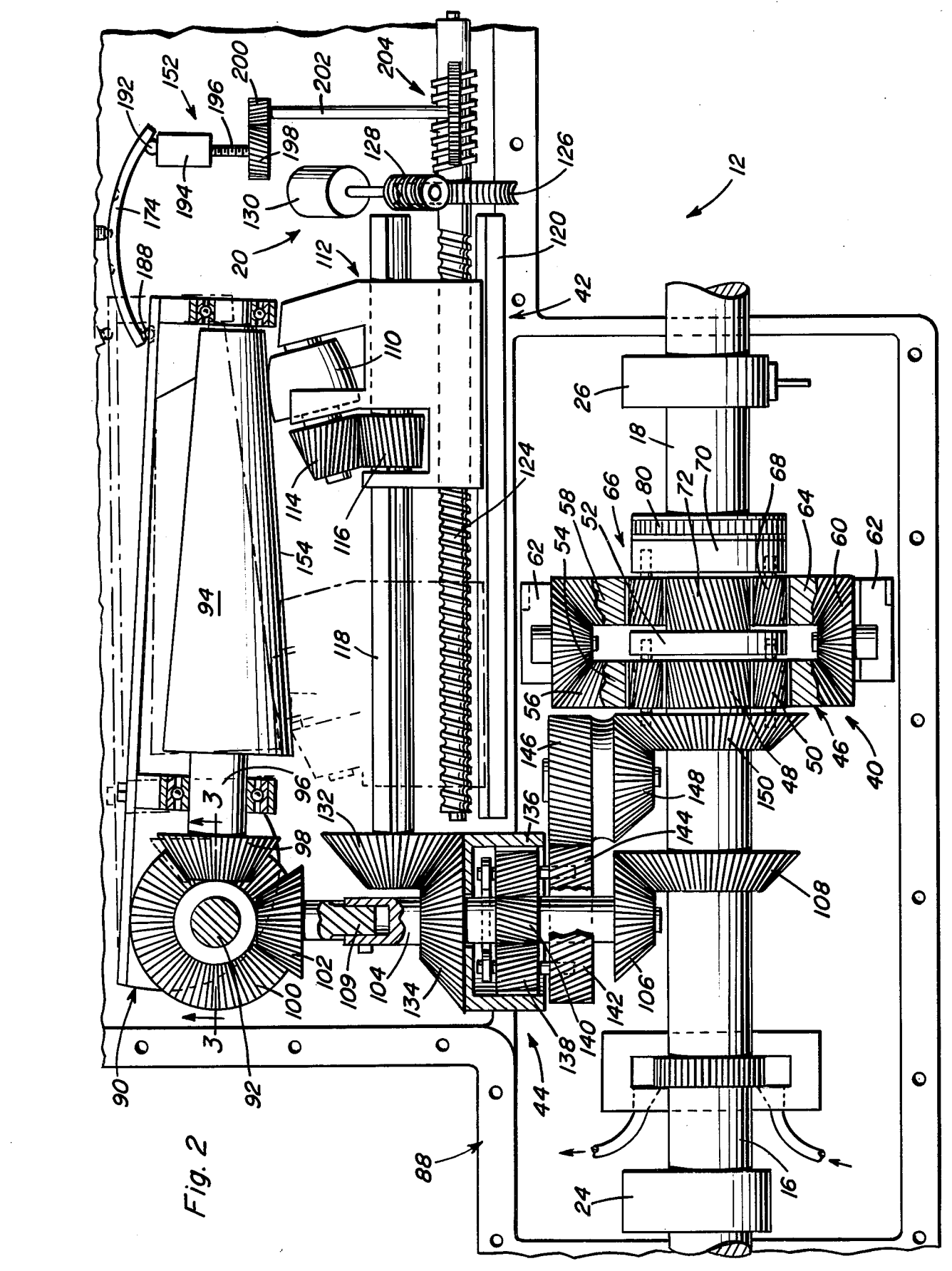

Referring now to FIG. 2 in particular, the transmission 12 is shown. The input shaft 16 is drivingly interconnected with the output shaft 18 through a power transmitting gear assembly generally referred to by reference number 40. The input shaft is also driving connected to an infinitely variable traction drive assembly generally referred to by reference numeral 42. The drive ratio control component is connected to the variable traction drive assembly for automatic selection of the drive ratio. The main power transmitting gear assembly 40 is drivingly interconnected with the variable traction drive assembly through torque bias control gear means generally referred to by reference numeral 44.

Figure 8:
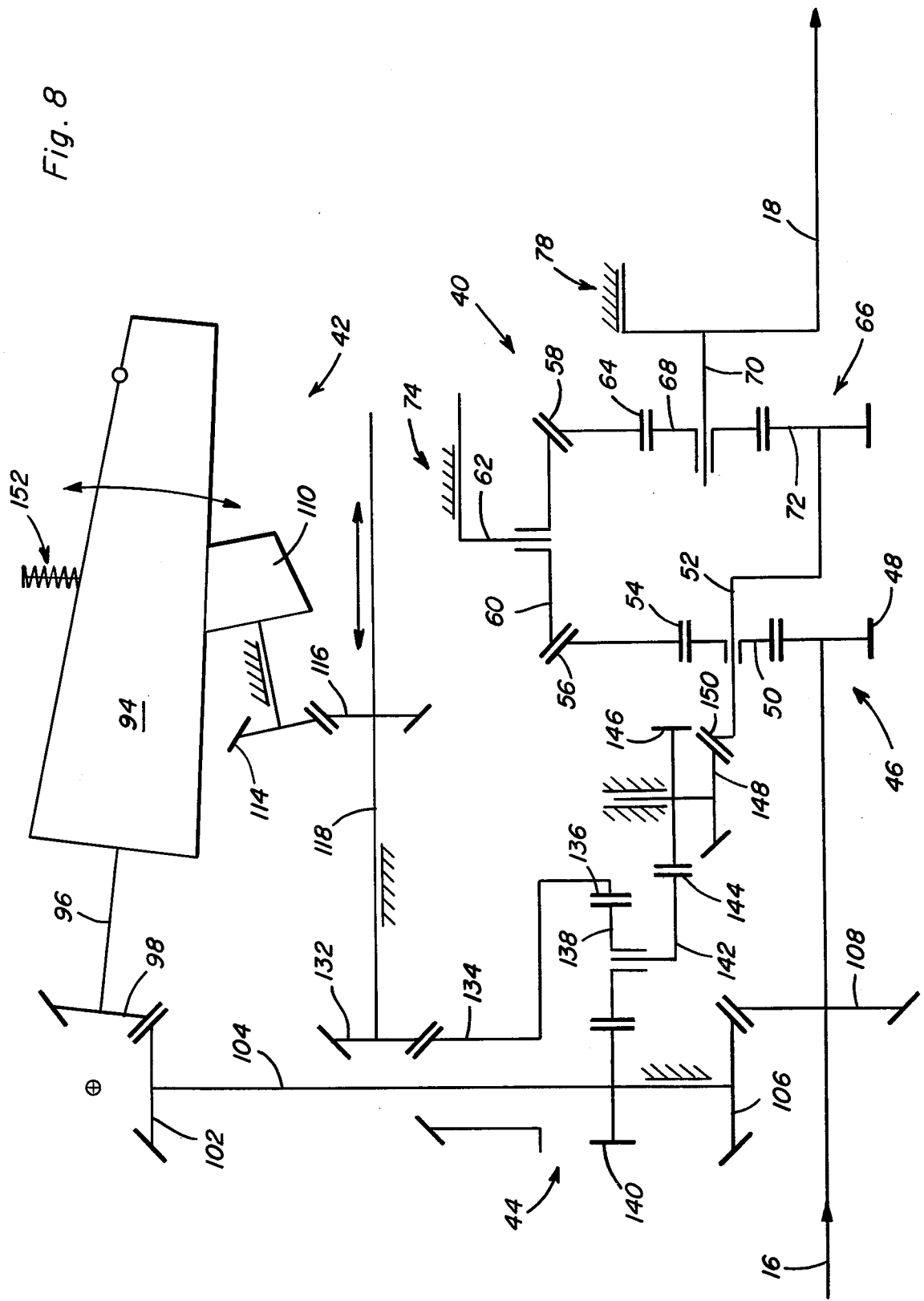
FIG. 8 is a schematic representation of the gear train arrangement associated with the transmission.

As more clearly seen in FIGS. 2 and 8, the power transmitting gear assembly 40 includes a differential planetary gear set 46 formed by a sun gear 48 fixed to one end of the input shaft 16, the sun gear being in constant mesh with a plurality of planet gears 50 rotatably mounted on a carrier element 52. The planet gears also mesh with internal orbit gear teeth 54 associated with an external bevel gear 56. The bevel gear 56 is drivingly connected through a bevel gear 58 to orbit gear 64 by means of intermediate bevel gear 60 rotatably mounted by radial axles on an annular drive control member 62. Alternatively, orbit gear 54 may be drivingly connected to orbit gear 64 through idler spur gears having a disengageable clutch in the gear train replacing a disengageable brake associated with drive control member 62 to be described hereafter. The internal orbit gear 64 forms part of a power path combining planetary gear set generally referred to by reference numeral 66 and is in constant mesh with planet gears 68 rotatably mounted by a carrier 70 fixed to the output shaft 18. The planet gears 68 are also in mesh with a sun gear 72 that is secured to the carrier 52 of the differential gear set 46.

It will be apparent that the input shaft 16 will transmit torque through the differential gear set 46 at a drive ratio dependent on the rotational speed of the carrier 52 relative to the sun gear 48. Thus, the carrier 52 is rotated at a lower speed than the input shaft to enable transmission of high torque through the differential gear set 46 to the orbit gear 54 under control of a relatively low torque drive through the variable speed drive assembly 42 as will be hereafter explained. The same power path through which low torque is transmitted to the carrier 52 for drive ratio control purposes is also transmitted to the sun gear 72 of the power path combining gear set 66. High torque is transmitted to the gear set 66 from the orbit gear 54 through the bevel gears 60 when the annular element 62 is held stationary. Thus, a positive drive control brake element 74 is projected into engagement with the annular element 62 as shown in FIGS. 4 and 5 for holding the same stationary while the transmission is in operation. The brake element 74 is withdrawn from engagement by means of the power interruption control component 22 aforementioned in order to interrupt the transmission of the power to the output shaft.

In the illustrated embodiment shown in FIGS. 4 and 5, the brake element 74 as well as a second positive brake element 78 are pivotally mounted by pivot brackets 79 and 79' and respectively biased into engagement with annular element 62 and parking brake teeth 80 fixed to the carrier 70 or output shaft 18 by springs 81. Pins 83 and 83' projecting laterally from an operating slide element 76, engage cam surfaces 85 and 85' respectively formed in pivot brake elements 74 and 78. Thus, the operating slide element 76 will alternatively cause engagement of the drive control brake element 74 or the parking brake element 78. The operating element 76 is displaced to the two braking positions by means of the power interruption control component 22 through an actuating rod 82 and a crank element 84 engaged with the operating element 76. A detent assembly 86 engageable with the operating element 76 yieldably holds it in one of three positions including the two brake positions (park and drive) as well as an intermediate neutral (N) position in which both brake elements 74 and 78 are disengaged.

As shown in FIGS. 2 and 3, the input and output shafts and power transmitting gear assembly 40 are appropriately supported in a transmission housing generally referred to by reference numeral 88. A bearing assembly 89 pivotally mounts a frame 90 about an adjustably fixed axis through pivot shaft 92 fixed to support brackets 93 as more clearly seen in FIG. 3. The frame 90 rotatably mounts an elongated drive cone member 94. The cone member 94 is rotated about an axis which intersects the pivotal axis through shaft 92.

Thus, a drive shaft 96 connected to the large diameter end of the drive cone member 94 has a bevel gear 98 connected thereto, the bevel gear being in constant mesh with an idler bevel gear 100 rotatably mounted by sleeve 101 on the pivot shaft 92. A bushing 103 carried on the pivot shaft 92 mounts a socket bearing 105 receiving a bearing projection 107 on the gear 98. The bevel gear 98 is drivingly connected by bevel gear 100 to a bevel gear 102 connected to a drive shaft 104 by an adjustment spline coupling 109. The other end of the drive shaft 104 opposite the bevel gear 102 has a bevel gear 106 connected thereto, the bevel gear 106 being in constant mesh with bevel gear 108 fixed to the input shaft 16. Accordingly, the drive cone member 94 will be directly driven at a high speed by the input shaft through a low torque drive connection established by the bevel gears 108, 106, 102, 100 and 98.

The drive cone member 94 is held in traction drive engagement with an axially smaller drive cone member 110 rotatably mounted by means of a carriage 112. The cone member 110 is rotatable about an axis disposed at an acute angle to the rotational axis of the drive cone member 94. A mitered helical gear 114 is connected to the cone member 110 and is in constant mesh with a like drive gear 116 also rotatably carried on the carriage. The gear drive 116 is furthermore mounted on a splined jack shaft 118 for rotation therewith and for axial displacement relative thereto with the carriage 112. The carriage is mounted for slidable displacement on a track or slideway 120 fixed to the housing and is internally threaded for engagement with a positioning screw shaft 124 by means of which movement is imparted to the cone member 110 between limit positions respectively shown by solid and dotted lines in FIG. 2 for changing the transmission drive ratio. A worm wheel 126 is therefore connected to the screw shaft and meshes with a worm gear 128 driven by a reversible electric motor 130 to change the drive ratio. Energization of the motor 130 may be controlled toward that end by the drive ratio control component 20 depicted in FIG. 1.

It will be apparent that the input shaft will transmit torque at a variable speed ratio to the spline shaft 118 of the variable traction drive assembly through the cone members 94 and 110. The spline shaft has a bevel gear 132 connected to to one end thereof in constant mesh with a bevel gear 134 rotatably mounted on the drive shaft 104. The bevel gear 134 is connected to an orbit gear 136 associated with the torque control gear set 44 which includes plant gears 138 in mesh with the orbit gear and with a sun gear 140 fixed to the drive shaft 104. The planet gears are rotatably mounted on a carrier 142 having external gear teeth 144 in mesh with a gear 146 rotatably mounted about a fixed axis. The gear 146 is connected to a bevel gear 148 in mesh with bevel gear 150 which is in turn connected to the planet gear carrier 52 associated with the planetary gear set 46. Thus, the high speed power take-off from the input shaft is reduced as a function of the input shaft speed by means of the torque control gear set 44 to transmit a relatively low torque at a variable speed controlled by the traction drive assembly 42 to the planetary gear sets 46 and 66 of the power transmitting gear assembly 40.

The drive cone members 94 and 110 of the variable speed drive assembly 42 have frictional engaging surfaces 154 and 156 of generally the same pitch relative to their respective rotational axes. The engaging surfaces of the cone members are furthermore held in engagement with each other for all positions of the cone member 110 by means of a tension control device 152 as more clearly seen in FIGS. 2 and 6. The cone member 110 is also provided with a crown curvature on its frictional engaging surface 156 as more clearly seen in FIG. 9. As a result of this crown curvature and its cooperative relationship to the pivotal displacement of the cone member 94, slippage wear is reduced to a minimum and torque is transmitted in a most efficient manner at all drive ratios within the operating range of the drive assembly 42. The operating drive ratio range associated with the transmission may therefore extend between a five to one reduction ratio in reverse through neutral and forward reduction ratios up to a 1-to-1 direct drive ratio in one embodiment of the invention by way of example.

The drive engaging surface of the cone member 94 engages the cone member 110 along a contact line 154 that is displaced with the cone member 94 in response to movement of the cone member 110 under the bias tension of the engaging pressure exerted by device 152. The curvature of the engaging surface 156 of the cone member 110 deviates from the general pitch of the cone member so as to be tangential to the contact line 154 for all pivotal positions of the cone member 94. Through the spline coupling 109, the fixed position of the pivot shaft 92 may be precisely adjusted so as to accommodate selection of the crown curvature 156 for the cone 110 in relation to spring and leverage adjustments for device 152. The point of contact on cone member 110 will therefore shift in order to correct for any error that would otherwise be introduced because of the pivotal displacement of the cone member 94 in response to movement of the cone member 110 between the opposite limit positions shown by solid and dotted line in FIG. 2. Movement of the cone member 110 between the aforesaid limit positions will change the drive ratio of the friction drive assembly 42 in accordance with the ratio of the cone diameters in a plane extending through the point of contact 157 between the cone members as more clearly seen in FIG. 9. The shift in the location of this point of contact relative to the cone member 110 because of its crown curvature reduces slippage.

Figure 7:
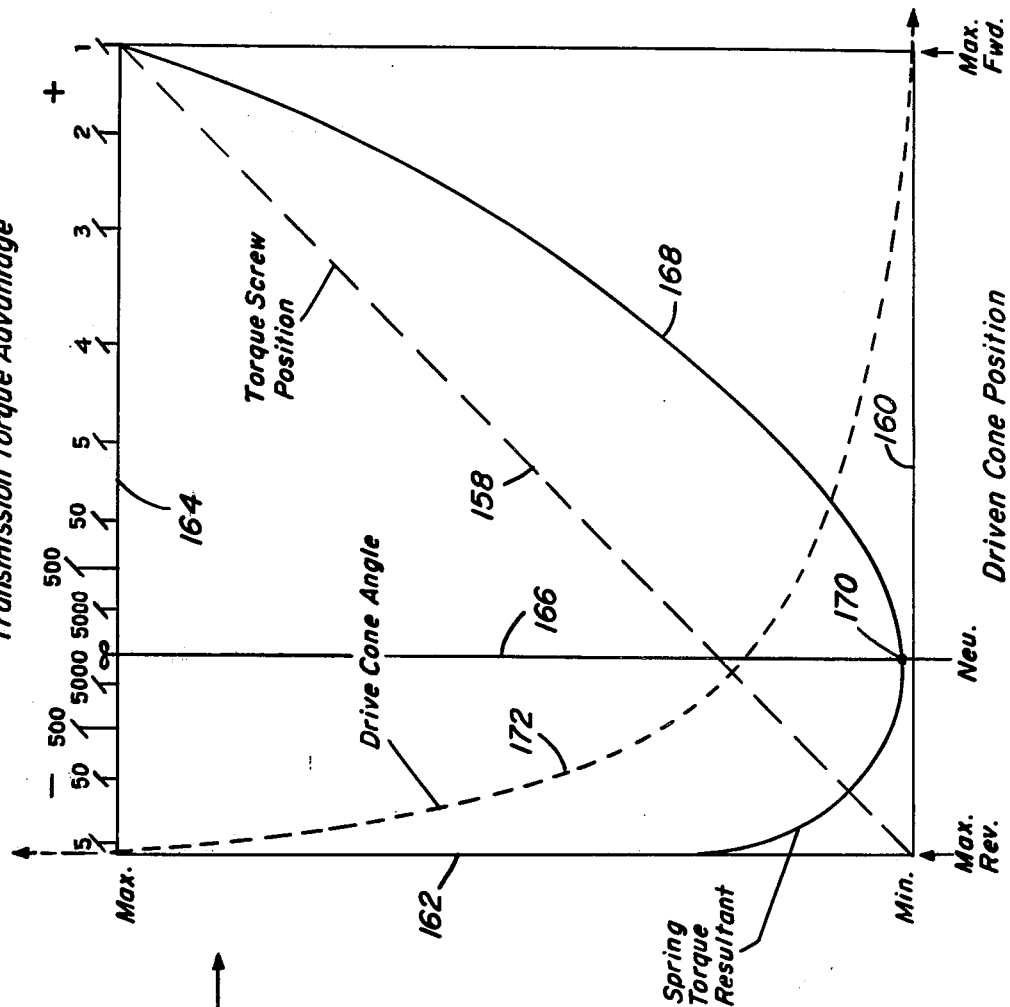
FIG. 7 is a graph depicting certain characteristics associated with the transmission.

Referring now to FIG. 7, a linear relationship is depicted by the straight line curve 158 between the positions of cone member 110 as reflected on abscissa scale 160 and the output speed of the variable speed drive assembly 42 reflected on ordinate 162. The position of the cone member 110 corresponds to a transmission torque ratio as shown on a second abscissa scale 164. At one position of the cone member 110, where the line 166 intersects the abscissa scales 160 and 164, the engaging spring pressure reflected by the nonlinear curve 168 is arranged to be at a minimum point 170. This minimum pressure point corresponds to a neutral condition of the transmission as shown on scale 164 where the torque ratio approaches infinity. The graph of FIG. 7 also shows curve 172 reflecting the angular change of the contact line 154 of the cone member 94.

The contact pressure exerted by the tension control device 152 is varied in accordance with the characteristic of curve 168 so that a minimum or virtually no pressure is exerted in the neutral position of the cone member 110. The device 152 includes a leaf spring element 174 as more clearly seen in FIG. 6 provided with a plurality of recesses 176 on its upper surface. One of the recesses 176 is yieldably engaged by a ball element 178 associated with an adjustable tension assembly 180. The tension assembly includes a threaded bolt 182 adjustably positioned in the case 88 through a threaded bore 184 to hold ball element 178 in a corresponding recess 176 of the spring 174 at an adjusted tension to transmit an engaging pressure producing force. The adjusted tension of spring 174 is applied to the pivotal frame 90 supporting the cone member 94 by means of a terminal element 88 at one end of the spring 174 received in a recess 190 formed in the frame 90 for this purpose. A terminal element 192 at the other end of the spring is seated within a spring reaction support 194 that may be adjustably displaced in an axial direction relative to a screw shaft 196 with which it is threadedly engaged. The adjustment screw shaft 196 is drivingly connected by gears 198 and 200 to a drive shaft 202 which is in turn drivingly connected by worm gearing 204 to the screw shaft 124 through which movement is imparted to the carriage 112 mounting the shiftable cone member 110. Thus, rotation of screw shaft 124 in one direction causing axial shift of carriage 112 in a left-hand direction, toward the position shown by dotted line in FIG. 2, will cause axial movement of support 194 relative to screw shaft 196 being rotated in order to accommodate some pivotal displacement of spring element 174 about an adjustable pivot established by assembly 180 as the frame is displaced toward the dotted line position shown in FIG. 2.

It is apparent from the foregoing description of the tension control device 152, that the support 194 will be displaced automatically in response to rotation of the screw shaft 124 causing movement of the cone member 110 and a change in the drive ratio. Such displacement of the support 194 will correspondingly shift the spring reaction point and thereby change the spring tension applied to the pivotal frame 90. The drive engaging pressure established is thereby varied in accorance with the characteristic of curve 168 as aforementioned. By relocating tension adjustment bolt 182, the leverage ratio between the frame 90 and plunger 194 may be changed for different transmission requirements. Further, by selection of different spring characteristics for spring 174 and axial adjustment of bolt 182, the resulting spring pressure curve 168 may be influenced to match load performance requirements.

From the foregoing description of the gear train arrangement, diagrammatically depicted in FIG. 8, it can be shown that the overall drive ratio (R) between the output shaft 18 and the input shaft 16 for any given speed of the input shaft is varied in accordance with the following expression:

$$R = A - Br$$

Where r is the variable drive ratio of the variable drive assembly 42 while A and B are constants determined from the relative numbers of gear teeth in the gear train. It will be evident from the foregoing expression that the overall drive ratio (R), the reciprocal of which corresponds to the torque ratio shown on scale 164 in FIG. 7, will be zero while changing from a forward drive ratio to a reverse drive ratio as the value of (r) reaches and increases above (A/B) corresponding to the predetermined position of the cone member 110 aforementioned at which the contact pressure is designed to be minimum. Thus, at such neutral position of the cone member, the transmission will be in an idling condition from which the transmission may be shifted in either a forward or reverse drive direction by directional displacement of the carriage 112 along track 120. Since only a small fractional portion of the torque transmitted by the transmission is transmitted along the power path established through the traction drive cone members 94 and 110 of the variable drive assembly 42, changes in the overall drive ratio may be effected in a smooth, efficient and precise manner with a minimal amount of wear.

What is claimed as new is as follows:

1. A change speed transmission, comprising input and output elements, torque biasing differential gear means connected to the input element for establishing a relatively low torque path to which power is applied from the input element, power combining means connected to the differential gear means for transmitting power from said input element along a relatively high torque path to the output element under control of power transmitted through the relatively low torque path to establish a drive ratio between the input and output elements, traction drive means drivingly connected to the input element and the differential gear means for selectively controlling the power transmitted through said relatively low torque path to vary the drive ratio, and tension control means connected to the traction drive means for maintaining operation thereof under an engaging pressure that varies with changes in the drive ratio, said differential gear means including a power transmitting planetary gear set and a torque bias control planetary gear set, each of said planetary gear sets having an input gear drivingly connected to the input element, a driven gear and a planet gear carrier, and means drivingly interconnecting the carriers at a fixed drive ratio, said driven gear of the torque bias control planetary gear set being interconnected with the traction drive means and acting as a reaction element to effect transmission of power to said carrier of the power transmitting planetary gear set connected to the power combining means.

2. The combination of claim 1, wherein said engaging pressure is minimum at a neutral value of the drive ratio when substantially no torque is delivered to the output element.

3. The combination of claim 1, wherein said traction drive means includes a pair of variable traction members having drive engaging surfaces of generally equal pitch, means drivingly connecting one of the members to the input element and means drivingly connecting the other of the members to the differential gear means.

4. The combination of claim 3, wherein the traction drive means further includes means mounting said one of the members for pivotal displacement about a fixed axis, and means connected to the other of the members for movement thereof relative to said one of the cone members causing said pivotal displacement, the engaging surface on said other of the members having a crown curvature establishing tangential contact with the engaging surface of said one of the members at an instantaneous position that is a linear function of said movement of the other of the members.

5. The combination of claim 4, wherein said tension control means includes spring means urging the surfaces of the traction members into contact with each other under said engaging pressure and means responsive to displacement of the traction members relative to each other for varying the force exerted by the spring means.

6. The combination of claim 1, wherein said tension control means includes spring means urging said surfaces of the traction members into contact with each other under said engaging pressure and means responsive to displacement of the traction members relative to each other for varying the force exerted by the spring means.

7. In a variable speed transmission having an input element and a driven element, at least two traction members having drive engaging surfaces, gear means drivingly connecting one of the members to the input element, additional gear means drivingly connecting the other of the members to the driven element for establishing a drive ratio between the input and driven elements, means connected to said other of the members for movement thereof to vary the drive ratio between forward and reverse drive, and tension control means for maintaining said drive engaging surfaces of the members in contact with each other under an engaging pressure that increases from a minimum value with changes in the drive ratio, said tension control means including a spring element engageable with one of said members, adjustably positioned support means for establishing a reaction point for the spring element and means displaceable in response to said movement of the members relative to each other for displacing the reaction point to vary the tension of the spring element.

8. In combination with a change speed transmission having at least two power paths to which torque is transmitted between input and output elements, means combining said two power paths for transmitting power to the output element at a drive ratio variable between forward and reverse ratios and traction drive means in one of said power paths for varying the drive ratio, tension control means connected to the traction drive means for exerting an engaging pressure thereon to enable transmission of torque through said one of the power paths, and means for increasing said engaging pressure from a minimum value as the drive ratio changes between said forward and reverse ratios, said engaging pressure varying means including a spring element engageable with said traction drive means, adjustably positioned support means for establishing a reaction point for the spring element and means displaceable in response to said change in the drive ratio for displacing the reaction point to vary the tension of the spring element.

9. In a variable speed transmission having an input element and a driven element, a pair of conical traction members having drive engaging surfaces of generally equal pitch, gear means drivingly connecting one of the members to the input element,, means drivingly connecting the other of the members to the driven element, means connected to said other of the members for movement thereof relative to said one of the members to vary the drive ratio between the input and driven elements, means mounting said one of the traction members for pivotal displacement about a pivotal axis in response to movement of said other of the traction members, said input element being rotatable about a drive axis intersecting said pivotal axis, and adjustable coupling means connecting the input element to the gear means for adjusting the position of the pivotal axis.

10. A change speed transmission comprising input and output members (16, 18) power combining gear means (66) having two input elements and an output element connected to the output member, power transmitting means establishing two paths (52, 60) respectively connected to said input elements of the power combining gear means for drive of the output member, including gear means (46) connected to the input member and one of said power paths (52) for transmitting torque through the other of the power paths to one of the input elements (64) of the power combining gear means in parallel with the torque transmitted to the other of the input elements (72) to which said one of the power paths is connected, traction drive means (42) geared to the input member, differential gear means drivingly interconnecting the input member and the traction drive means to said one of the power paths of the power transmitting means for limiting torque transmitted therethrough to a fraction of the torque transmitted through the other of the power paths, and drive ratio control means connected to the traction drive means for varying the drive ratio between the input and output members.

* * * * *